(12) United States Patent
Fisher

(10) Patent No.: US 6,561,108 B2
(45) Date of Patent: May 13, 2003

(54) PLANTMAN SPHERICAL TRANSPLANTER

(76) Inventor: Jerome David Fisher, W7800 Hyw 151, Fond du Lac, WI (US) 54937

( * ) Notice: Subject to any disclaimer, the term of this patent is extended or adjusted under 35 U.S.C. 154(b) by 0 days.

(21) Appl. No.: 09/899,793

(22) Filed: Jul. 6, 2001

(65) Prior Publication Data

US 2003/0005604 A1 Jan. 9, 2003

(51) Int. Cl.7 ............................................. A01G 23/02
(52) U.S. Cl. ........................ 111/101; 37/302; 171/62
(58) Field of Search ...................... 111/101, 45; 37/302, 37/403, 444, 303; 171/141, 46, 50, 21, 53, 63, 45, 62

(56) References Cited

U.S. PATENT DOCUMENTS

| | | | | |
|---|---|---|---|---|
| 2,652,639 A | * | 9/1953 | Kluckhohn | |
| 2,770,076 A | * | 11/1956 | Kluckhohn | |
| 3,512,276 A | * | 5/1970 | Juhl | |
| 3,936,960 A | * | 2/1976 | Clegg | |
| 4,045,891 A | * | 9/1977 | Grew | |
| 4,271,611 A | * | 6/1981 | Paul | |
| 4,903,418 A | * | 2/1990 | Loudon | |
| 4,979,321 A | | 12/1990 | Hall | |
| 5,081,941 A | * | 1/1992 | Weeks | |
| 5,133,268 A | * | 7/1992 | Delisle | |
| 5,348,361 A | * | 9/1994 | Ilchuk | |
| 5,490,340 A | * | 2/1996 | Muncy | |
| 5,950,549 A | * | 9/1999 | Stoner | |
| 5,957,213 A | * | 9/1999 | Loraas et al. | |
| 6,035,562 A | * | 3/2000 | Virnig et al. | |
| 6,343,659 B1 | * | 2/2002 | Sexsmith | |
| 6,382,113 B2 | * | 5/2002 | Opitz | |

* cited by examiner

Primary Examiner—Victor Batson

(57) ABSTRACT

The present invention is a mechanical tree transplanting attachment that replaces the bucket of a loader-motor vehicle. The attachment is capable of excavating and planting a tree and root ball using a single hemispherical scoop with a fixture nestled within. The scoop rotates under the tree to excavate the tree and root ball. The fixture stops the root ball from rotating until the root ball is encompassed by the scoop and fixture. The loader-motor vehicle manipulates the attachment and tree from a ground contacting position to a transporting position. In this transporting position a tree is nearly horizontal with its root ball encompassed by the scoop and the fixture. When planting, the root ball is placed within a hole. The scoop passes from under the root ball while the fixture stops the root ball from rotating. The root ball is released from the scoop and fixture, planting the tree. The fixture includes features that allow for access to a tree, adjustments for differing terrain's and a plurality of excavation sizes, i.e., widths and depths.

7 Claims, 5 Drawing Sheets

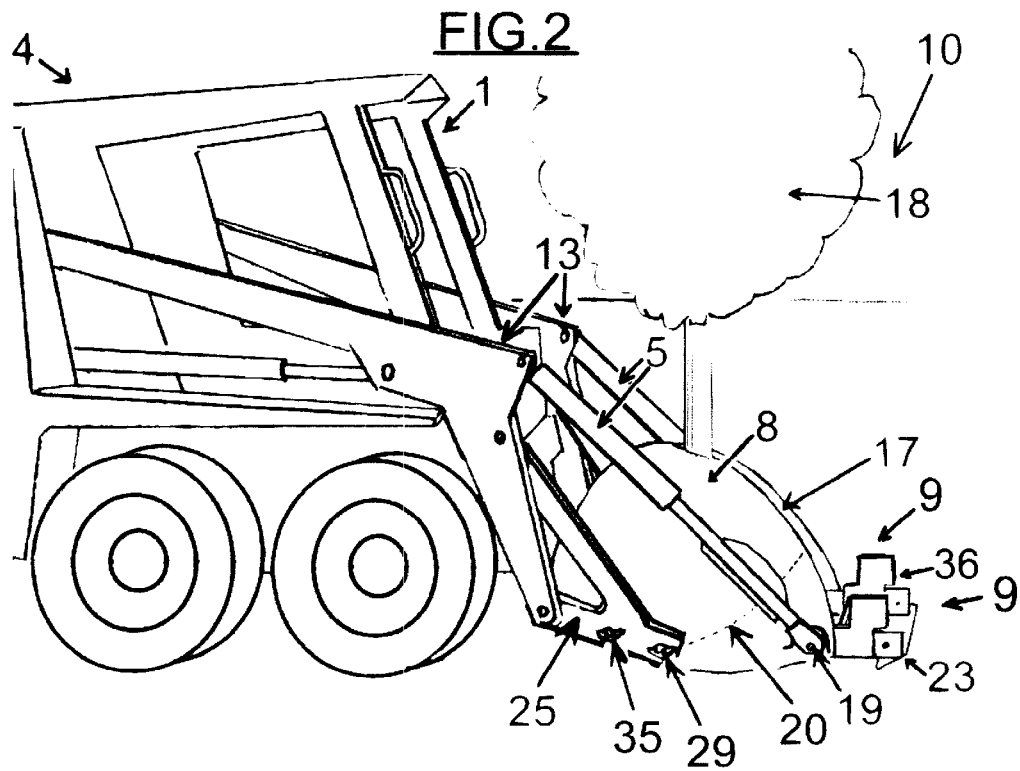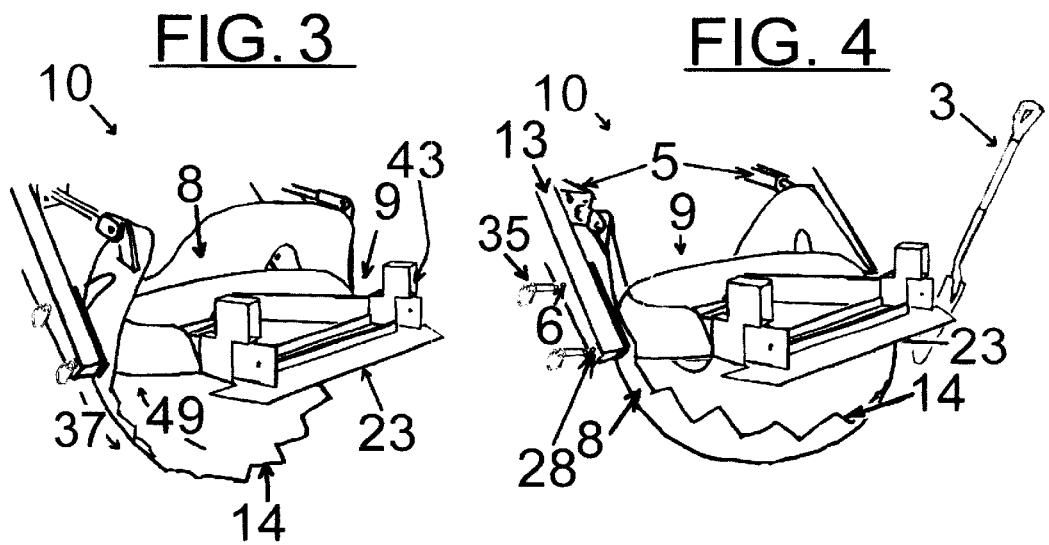

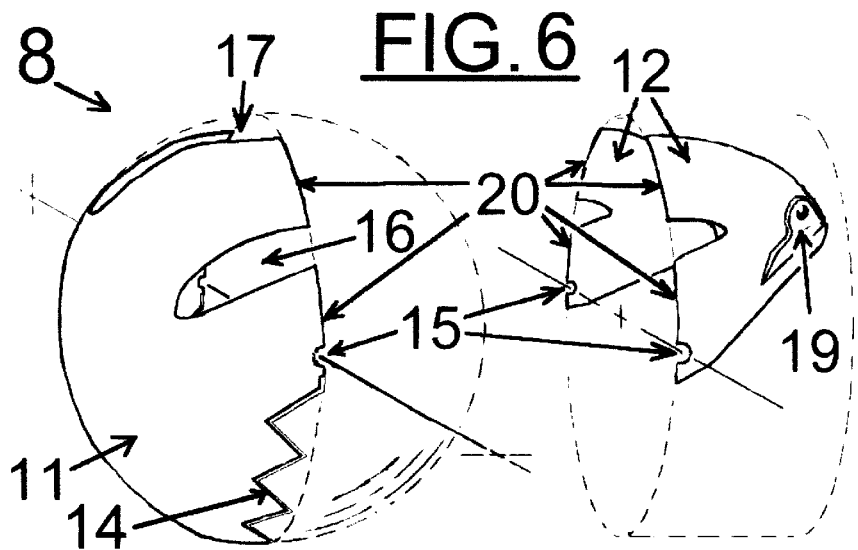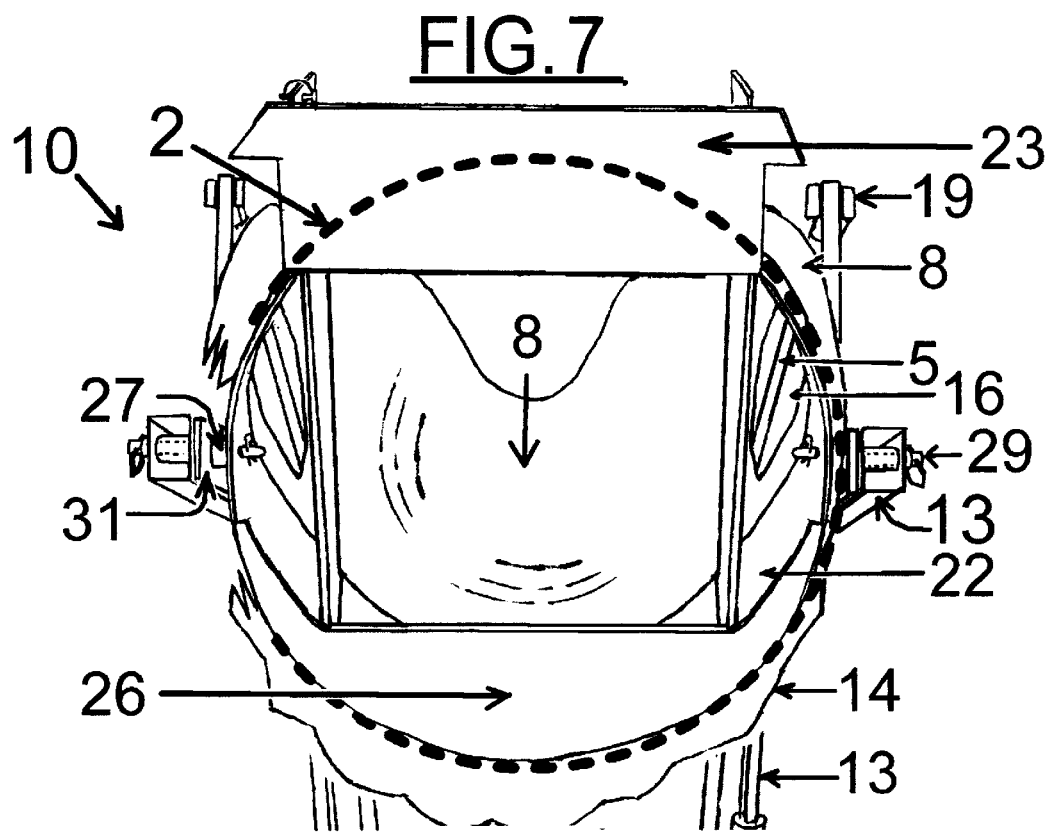

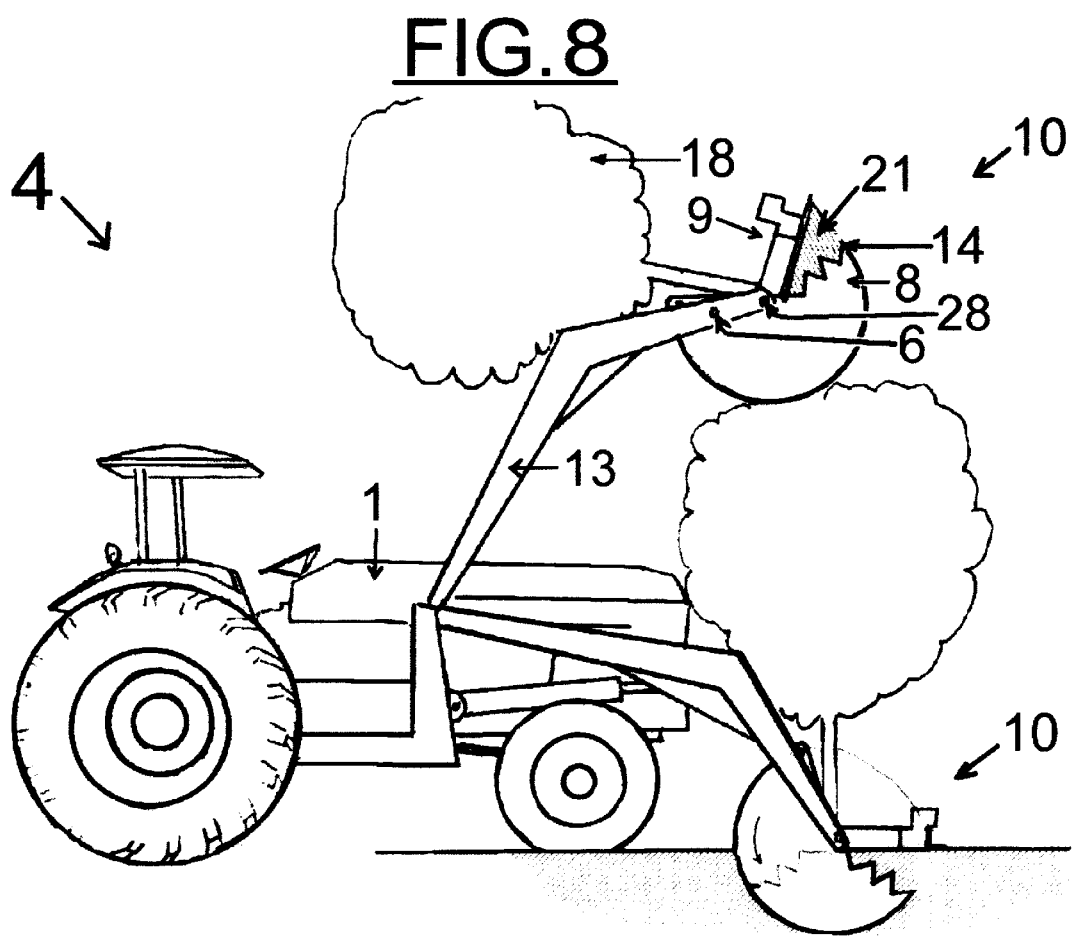

PLANTMAN SPHERICAL TRANSPLANTER

CROSS-REFERENCE TO RELATED APPLICATIONS

Not applicable

STATEMENT REGARDING FEDERALLY SPONSORED R&D

Not applicable

REFERENCE TO A MICROFICHE APPENDIX

Not applicable

BACKGROUND OF INVENTION

This invention relates to planting and excavating transplanter.

A variety of motor driven mechanisms have been developed for excavating trees and forming root balls for transplanting. In general the mechanisms are complex with multiple spades, hydraulics rams, controls, elaborate articulating frames, telescopic scoops, geometric linkages and dedicated hardware. This complexity is expensive and redundant with features usually found on equipment already. Simpler mechanisms lack some crucial features that rendered them too clumsy to be useful.

U.S. Pat. No. 5,133,268 Delisle, discloses a tree scooper operated by a combined rotating and backsliding action using an H-mount with internally mounted hydraulic cylinders and a power slider for linear motion which shapes a root ball. This mechanism is designed for harvesting not planting or transporting.

U.S. Pat. No. 4,979,321 Hall, discloses an excavator for excavating a tree and forming a root ball consisting of telescopic segments to form a bowl-shaped scoop and an elaborate supporting structures. The mechanism is; complex; costly and subject to damage resulting from obstacles in the segments.

U.S. Pat. No. 3,977,099 Stewart, uses a pair of parallelogram linkages to rotate a pair of spherical blades for forming a root ball and removing the plant. The mechanism is; costly and subject to damage resulting from contact with the soil.

U.S. Pat. No. 4,045,891 Grew, discloses a structure in which the three blades are provided which serve to dig into the soil at intervals around the root ball. The mechanism is costly and lacks restraint while transporting.

U.S. Pat. No. 3,889,402 discloses an excavator in which two blades are mounted to move toward one another from opposite sides of the plant in order to form the root ball during the excavation operation. The mechanism is costly.

U.S. Pat. No. 3,936,960 discloses a structure in which a plurality of spades are arranged to be driven into the soil so as to converge below the plant in order to form a root ball. The mechanism is costly.

BRIEF SUMMARY OF INVENTION

The present invention is a tree transplanter designed to replace the bucket of a loader-motor vehicle, is simple in design, relatively inexpensive, and overcomes the drawbacks and disadvantages of prior art of tree transplanter design. The tree transplanter comprises a fixture mounted and anchored to the loader's arms and nestled within a single rotating scoop. When harvesting a tree, the scoop rotates under the root ball while the fixture stops the root ball from rotating, in effect pushing the root ball into the scoop. When transporting a tree, the root ball is securely surrounded by the platform and scoop. When planting, the scoop rotates from under the root ball while the fixture stops the root ball from rotating, in effect pushing the root ball out of the scoop.

It is therefore an object of the present invention to provide a relatively inexpensive transplanter design that is suitable for use with a loader-motor vehicle and is particularly adapted to all operations involved in tree transplanting.

Another object of the present invention is to provide a tree transplanter that is designed to dig a bowl-shaped hole at the planting site, securely transport the resulting soil ball to the donor site, dig up the tree being transplanted, securely transport the tree to the planting site and plant the tree in the previously dug hole. If multiple trees are being transplanted, the resulting soil balls from the planting site can be placed in the holes left from prior donor sites.

Other objects and advantages of the present invention will become apparent and obvious from a study of the following description and the accompanying drawings which are merely illustrative of such invention.

BRIEF DESCRIPTION OF THE DRAWINGS

FIG. 2 is a perspective view of a tree transplanter showing the Plantman Spherical Transplanters position at the beginning of harvesting and the end of planting, constructed as an embodiment of the present invention relative to a loader-motor vehicle and articulating arm adapters on which it is mounted;

FIG. 3 is a perspective views of the Plantman Spherical Transplanter during operation;

FIG. 4 is a perspective views of the Plantman Spherical Transplanters position at the end of harvesting and the beginning of planting;

FIG. 6 is a perspective view of the blade and weldments of the scoop;

FIG. 7 is a perspective view of the underside of the Plantman Spherical Transplanter and FIG. 8 is a side view showing two positions of the Plantman Spherical Transplanter in accordance with an embodiment of the present invention relative to the loader-motor vehicle on which it is mounted.

DETAILED DESCRIPTION OF THE INVENTION

Figure 1:
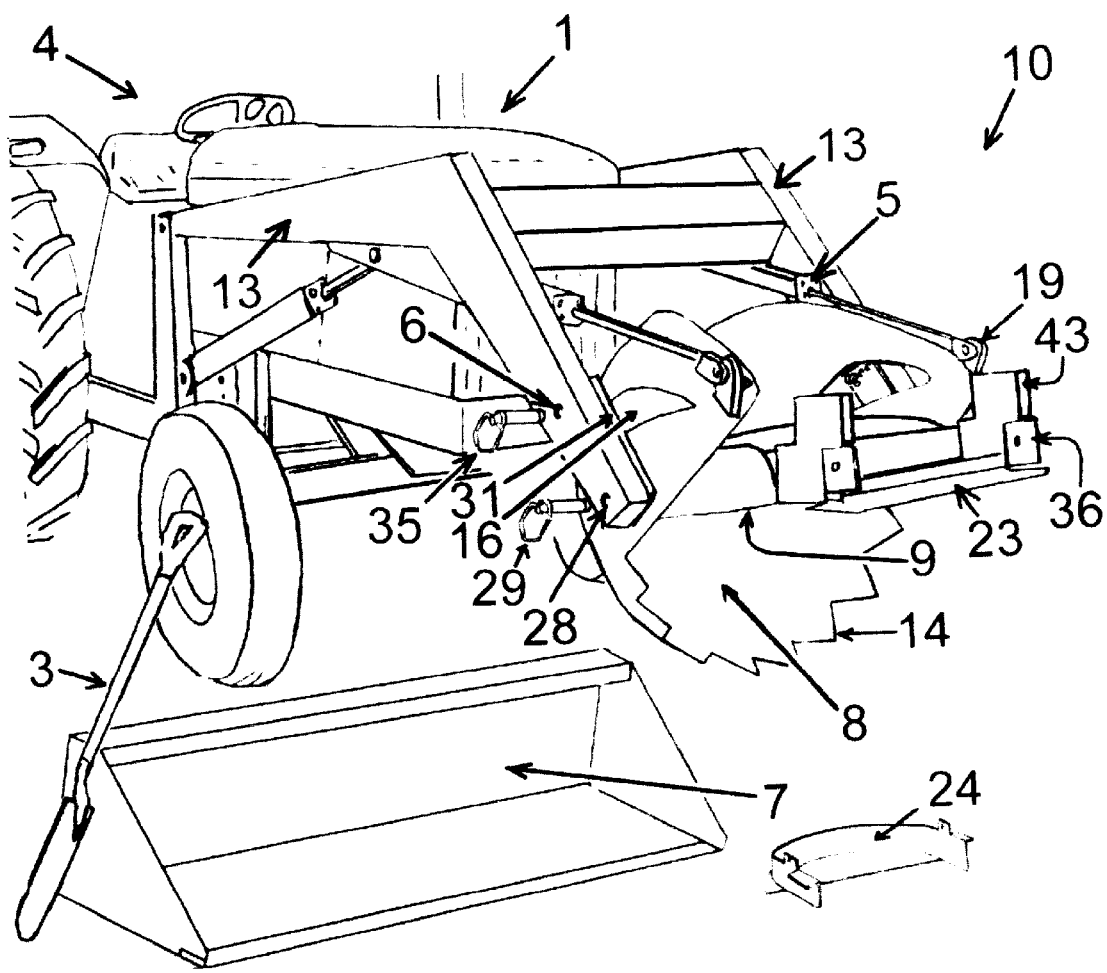
FIG. 1 is a perspective view of a tree transplanter showing the Plantman Spherical Transplanter constructed as an embodiment of the present invention relative to a loader-motor vehicle, the original bucket and a shovel.

With reference to FIGS. 1, 2, and 8 of the drawings, the Plantman Spherical Transplanter is the present invention and is shown therein and indicated generally by the numeral 10 constructed as an embodiment of the present invention.

As will be appreciated from subsequent portions of this disclosure, Plantman Spherical Transplanter 10 is adapted to be mounted to a loader-motor vehicle. There are many commercially available loader-motor vehicles and it is to be understood that the Plantman Spherical Transplanter 10, the present invention, could be adapted to be mounted to all such loader-motor vehicles.

With further reference to FIGS. 1, 2 and 8, the reference number 4 refers generally to a tree transplanter.

Tree Transplanter 4

The tree transplanter 4 comprises a loader-motor vehicle 1, a garden shovel 3 and the Plantman Spherical Transplanter 10.

Loader-Motor Vehicle 1

With reference to FIGS. 1, 2, and 8, the reference number 1 refers to a loader-motor-vehicle and provides a chassis, power and transportation, articulating arms 13 and rotational bucket drive means 5.

ARTICULATING ARMS 13 (FIG. 8) comprising arms of the loader-motor vehicle 1, serves to mount 28, anchor 6 and manipulate the Plantman Spherical Transplanter 10 between a ground contacting position and a transporting position.

MOUNT 28 is usually the original bucket mount unless adapter 25 (FIG. 2) is used.

ANCHORING MEANS 6 comprising a bore or saddle (not shown) in the articulating arms 13, serve to resist rotational bucket drive means 5.

As will be shown the anchoring means 6 (FIG. 4) anchors the fixture 9 so that it is not to move when the drive means 5 causes scoop 8 to move from the position shown in FIG. 2 to the position shown in FIG. 3 to the position shown in FIG. 4 to the position shown in FIG. 3 to the position shown in FIG. 2.

ROTATIONAL DRIVE MEANS 5 (FIG. 1) comprising hydraulics originally for the original bucket 7 of the loader-motor vehicle 1, serve to drive the Plantman Spherical Transplanter 10.

Garden Shovel 3. (FIGS. 1 and 4)

Plantman Spherical Transplanter 10

As illustrated in FIG. 1, the Plantman Spherical Transplanter 10, replaces the original bucket 7 from the loader-motor vehicle 1, is made of steel and is comprises of a scoop and a fixture.

Scoop 8

With reference to FIGS. 1, 2, 3, 4, 6, 7 and 8, the reference number 8 refers generally to the entire scoop assembly 8.

As illustrated in FIG. 6 comprises a blade 11 and two weldments 12.

BLADE 11 is a hemisphere shape. Half of the blades rim edge is sharpened 14 to facilitate soil penetration as the scoop 8 pivots at bore 15 at the center line of the rim of the hemispheric blade. Area 16 is removed from ether side of the blade 11 for clearance to the drive means 5 (FIG. 1). Area 17 is removed for clearance to a tree.

WELDMENTS 12 are curved and have clevis mounts 19 for the drive means 5 (FIG. 1), The weldments 12 are welded to the blade 11 at the seam 20. Weldments 12 act as arms to rotate the scoop 8 around the bore 15.

Fixture 9

With reference to FIGS. 1, 2, 3, 4, 5 and 8, the number 9 refers generally to the entire fixture assembly 9.

Figure 5:
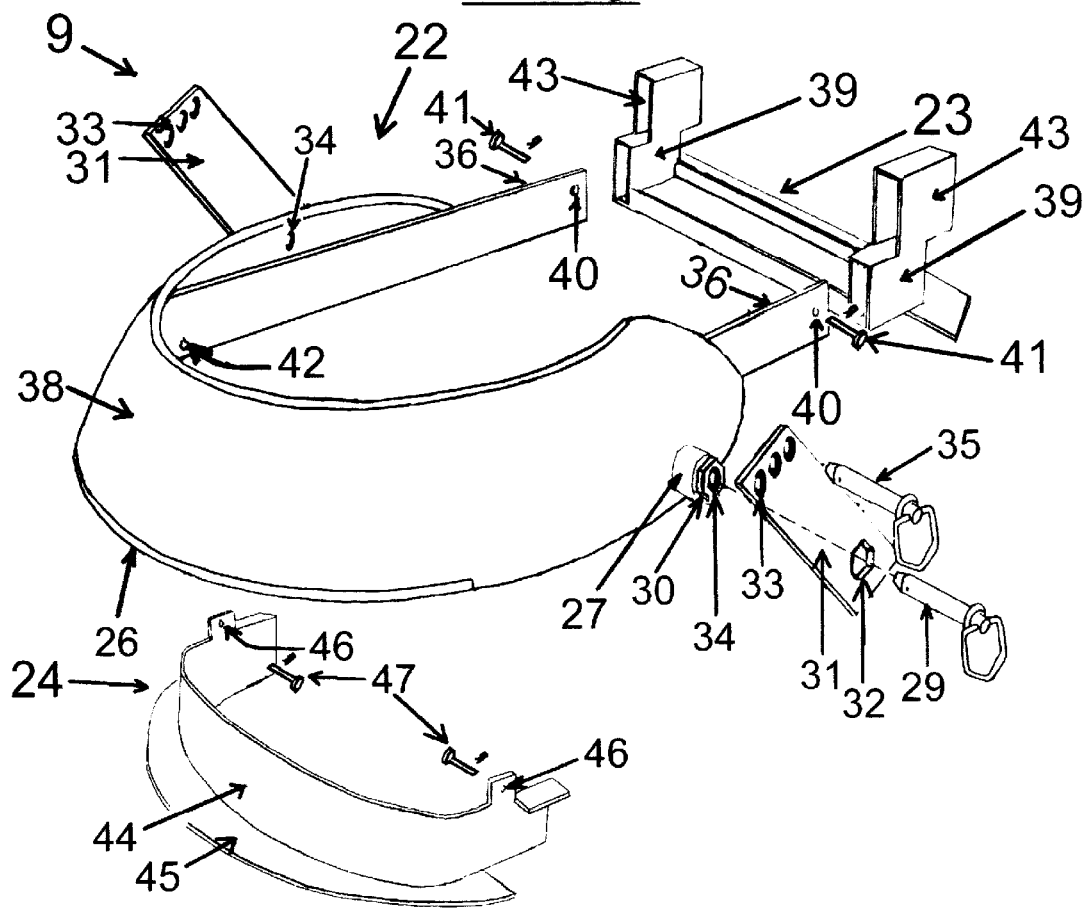
FIG. 5 is an perspective views of the fixture.

As illustrated in FIG. 5, the fixture 9 comprises a platform assembly 22, two resist plates 31, a removable plate 23 and an extension 24.

With reference to FIGS. 5 and 7, the number 22 refers generally to the platform assembly.

PLATFORM 22, with reference to FIG. 5, comprises a U-shaped frame 38, a plate 26, two pivot cylinders 27 and two male mounts 36.

The U-shaped frame 38 offer rigidity and ties the other elements of the platform 22 together.

The plate 26 is; cycloid shaped; welded to the bottom of the frame 38 and is in contact with the ground. The outer edge of plate 26 is in close proximity to the inner surface of the scoop 8 (FIG. 7). In use plate 26 resists rotation of the root ball when planting.

Each pivot cylinder 27 is hollow and welded half way up the outside of the arms of the frame 38. The pivot cylinders 27 outside diameter acts as pivotal mounts for the scoop 8 (FIG. 6). The pivot cylinders 27 inside diameter aligns with the articulating arm mount bore 28 (FIG. 1) and mounts the Plantman Spherical Transplanter 10 (FIG. 1) to the articulating arms 13 (FIG. 1) using pin 29. Each pivot cylinder is splined 30 on a portion of the outside diameter which mate with a splined bore 32 in each of the resist plates 31 as will be described.

Male mounts 36 are the top portions of the arms of the U-shaped frame 38 and mounts the removable plate 23 as will be described.

Two bores 42 located behind the pivot cylinders 27 and before the plate 26 on the frame 38 are used to mount the extension 24 as will be described.

RESIST PLATE 31, with reference to FIG. 5, uses a splined bore 32 to mate with the pivot cylinder spline 30. Resist plate 31 aligns a selection of bores 33 with the anchoring bore 6 (FIG. 1) and mounts the resist plate 31 to the articulating arms 13 (FIG. 1) with pin 35.

REMOVABLE PLATE 23, with reference to FIG. 5, combined with the platform 22 creates a O-shape and is in contact with the ground. The removable plate 23 has a selection of female mounts, pair 39 and pair 43, that slide onto the male mounts 36 on the platform 22 and are retained with pins 41 in bores 40. The lower female mounts 39 are used when a normal sized root ball is desired. The upper female mounts 43 are use in conjunction with the extension 24 as will be described.

In use the removable plate 23; is within and extends beyond the outline of the root ball 2 (FIG. 7); resist rotation of the root ball when harvesting by being fastened to the platform 22; allows access to a tree by being removable and is useful with a plurality of root ball sizes.

EXTENSION 24, with reference to FIG. 5, comprises a C-shaped frame 44, mount bores 46, and a plate 45.

The C-shaped frame 44 offer rigidity and mounts to the platform 22, aligning bores 46 to bores 42 on the platform 22 and inserting pins 47. The plate 45 is cycloid shaped; welded to the bottom of the frame 44 and is in contact with the ground. The outer edge of plate 45 is in close proximity to the inner surface of the scoop 8 (FIG. 7).

In use the extension 24 is use in conjunction with the upper pair of female mounts 43 of the removable plate 23, effectively lowering the fixture 9 relative to the rotating scoop 8, resulting in a smaller root ball.

Harvesting

With reference to FIG. 2, initially the scoop 8 will be in its retracted position with the removable plate 23 removed. The tree transplanter 4 encircles the tree 18 with its Spherical Transplanter 10 so that the tree 18 is centrally located within the fixture 9. The removable plate 23 is mounted onto the fixture 9 as shown. Articulating arms 13 assume the position shown, and applies weight. A slight motion toward the tree 18 by the tree transplanter 4 causes the initial soil penetration by the scoop 8. The bucket drive means 5 is then activated to rotate the scoop from the retracted position shown, to the mid position (FIG. 3), to the deployed position (FIG. 4). The fixture 9 will serve to stop the root ball 21 (FIG. 8) from rotating.

As shown in FIG. 8, the scoop 8 and fixture 9 creates and encompasses the root ball 21, the articulating arms 13 assumes the upper position and the tree 18 is nearly horizontal. The tree transplanter 4 can be driven along the roadway.

Pre Dug Hole

In use an additional step is used when pre digging a hole at a planting site. With reference to FIG. 4, inserting a garden shovel 3 into the soil several times around the front of the deployed Plantman Spherical Transplanter 10 takes a few seconds and creates a neat hole (not shown).

Loose Root Ball

With reference to FIG. 8, a loose fit of the root ball 21 encompassed by the scoop 8 and the fixture 9, resulting in a slight tipping of the tree, is negated by the fixture 9 when the scoop 8 is retracted during planting.

Planting

In use, at a planting site the tree transplanter 4 (FIG. 2) using its Plantman Spherical Transplanter 10 (FIG. 2) will place a encompassed trees root ball as shown in FIG. 8, into a pre dug hole (not shown). With reference to FIG. 4 of the drawing, initially the scoop 8 will be in its deployed position. The drive means 5 is then activated to rotate the scoop 8 from the deployed position until the stance of a tree can be determined. If a tree is not vertical due to differing terrain's, adjustments are made by changing how the selection of holes 33 (FIG. 5) relate to the anchoring means 6. The bucket drive means 5 is then activated to rotate the scoop 8 from the deployed position to the retracted position (shown in FIG. 2). The fixture 9 will serve to stop a root ball from rotating. Articulating arms 13 articulates upward to disengage the Plantman Spherical Transplanter 10 from the surface of the ground. The removable plate 23 is removed from the fixture 9 and the tree transplanter 4 is backed away from a planted tree.

Conclusion

The Plantman Spherical Transplanter 10 (FIG. 1) of the present invention has many advantages over conventional tree transplanter designs. In the present case, the Plantman Spherical Transplanter 10 (FIG. 1) is particularly adapted to all operations involved in tree transplanting. It takes advantage of the preexisting loader-motor vehicle mechanisms. It forms a complete root ball and provides for the restraint of the root ball as it is harvested, transported and planted. It has one moving part as compared to the plurality of expensive and vulnerable parts on conventional tree spades. It is useful and efficient in close and tight areas found in tree nurseries, woods and areas adjacent to structures. It can be easily mounted on any contrived loader-motor vehicle using simple adapters and extensions 25 (FIG. 2). Beyond transplanting duties, the Plantman Spherical Transplanter 10 can be utilized in other light duty excavation work.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

I claim as my invention:

1. A mechanical tree and root ball excavating and transplanting attachment for replacing a bucket on a pair of articulating arms of a loader-motor vehicle comprising:
   a. a scoop having a blade with a front having a sharpened rim, wherein said scoop is rotatable relative to the articulating arms of the loader-motor vehicle to penetrate the earth and dig an excavation; and
   b. a fixture anchorable to the articulating arms of the loader-motor vehicle, located within and pivotally connected to said scoop, wherein said fixture is for resting on the earth and remaining stationary with respect to the articulating arms of the loader-motor vehicle when said scoop rotates relative to the articulating arms of the loader-motor vehicle to prevent rotation of the excavation.

2. The mechanical attachment according to claim 1 wherein said fixture is characterized further in being:
   a. substantially centered within said scoop; and
   b. in close proximity to said scoop.

3. The attachment of claim 1 wherein said fixture comprises:
   a. a platform assembly for pivotally supporting said scoop; and
   b. a removable plate removably connected to said platform assembly for resting on the ground to prevent rotation of the excavation.

4. The attachment of claim 1 wherein said blade has an open area therethrough for clearing a tree.

5. A mechanical tree and root ball excavating and transplanting attachment for digging an excavation and replacing a bucket on a pair of articulating arms of a loader-motor vehicle comprising:
   a. a fixture having a front and a bottom rear portion; and
   b. a scoop,
   wherein the fixture is characterized in being:
      I. a pivotal mount for said scoop;
      II. anchored to and stationary with respect to said articulating arms of said loader-motor vehicle;
      III. adjustable to compensate for differing terrains of a tree harvesting and planting site;
      IV. comprised of a ground contactable removeable-plate;
      V. comprised of a ground contactable welded-plate welded to the bottom rear portion; and
      VI. comprised of an extension that adjusts the welded plate in relation to the scoop to thereby accommodate different size excavations.

6. The mechanical attachment according to claim 5 wherein said removable-plate is characterized further in being:
   a. on a front of said fixture;
   b. removable to facilitate access to a tree;
   c. extending over and beyond said excavation;
   d. overlying and resisting rotation of said excavation while harvesting, thereby holding said excavation in said scoop; and
   e. useful with plurality of excavation sizes.

7. The mechanical attachment according to claim 5 wherein said welded-plate is characterized further in being:
   a. overlying and resisting rotation of an excavation while planting, thereby pushing said excavation out of the scoop; and
   b. useful when planting in negating excess clearance of said excavation within said attachment.

* * * * *